United States Patent [19]

Sakakihara

[11] Patent Number: 5,042,060

[45] Date of Patent: Aug. 20, 1991

[54] METHOD AND SYSTEM FOR CHANGING PHOTOGRAPHIC FORMATS IN X-RAY EQUIPMENT

[75] Inventor: Hisashi Sakakihara, Ootawara, Japan

[73] Assignee: Kabushiki Kaisha Toshiba, Kawasaki, Japan

[21] Appl. No.: 455,003

[22] Filed: Dec. 22, 1989

[30] Foreign Application Priority Data

Dec. 27, 1988 [JP] Japan ................. 63-329734

[51] Int. Cl.[5] .......................... G03B 42/02
[52] U.S. Cl. ....................... 378/173; 378/174; 378/181; 378/182; 378/172
[58] Field of Search ............ 378/170, 172, 173, 174, 378/175, 181, 182, 167, 176, 116, 114, 115, 98, 62, 91

[56] References Cited

U.S. PATENT DOCUMENTS 4,782,504 11/1988 Weber et al. .................. 378/173

Primary Examiner—Edward P. Westin
Assistant Examiner—Don Wong
Attorney, Agent, or Firm—Cushman, Darby & Cushman

[57] ABSTRACT

In an X-ray equipment, a photographing program including a plurality of photographic formats is stored in advance. Program photographing is performed in accordance with the photographic formats read out in a predetermined order. When an interrupt signal is input during program photographing, a read operation of the photographic formats is temporarily interrupted, and photographing is performed in accordance with a newly input photographic format. In addition, when a skip signal is input during program photographing, the read out photographic format is cancelled, and program photographing is performed in accordance with the next photographic format.

6 Claims, 5 Drawing Sheets

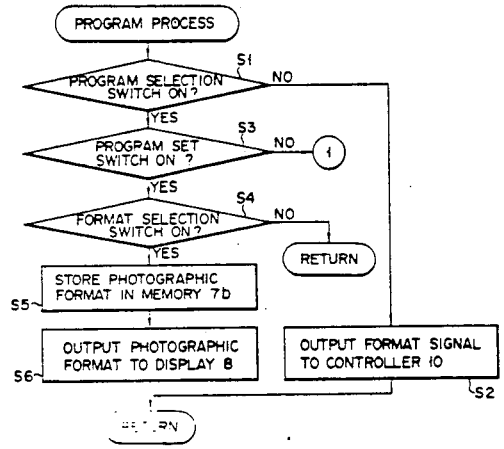

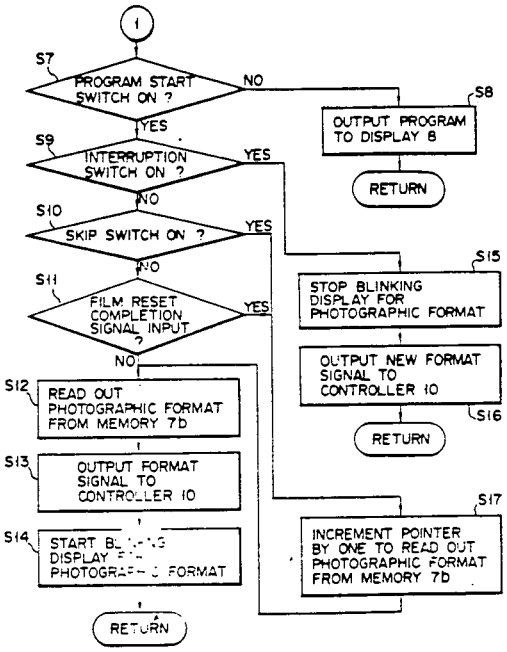

METHOD AND SYSTEM FOR CHANGING PHOTOGRAPHIC FORMATS IN X-RAY EQUIPMENT

BACKGROUND OF THE INVENTION

1. Field of the Invention

The present invention relates to a method and system for changing photographic formats in an X-ray equipment.

2. Description of the Related Art

In a conventional X-ray equipment, photographic formats including photographing film sizes and division formats are stored in a memory in advance in order to simplify an operation by a doctor or a radiographer. A photographic format is read out from the memory upon each output of an X-ray generation signal to perform program photographing in accordance with the readout photographic format.

In an X-ray equipment for performing program photographing, when routine X-ray photographing is performed as in group examination, an operation by the doctor or radiographer can be simplified. However, when the photographic format is partially changed in individual photographing, program photographing cannot be performed. In other words, when a photographic format different from the stored photographic format is used during program photographing, program photographing must be interrupted. In addition, an unrequired photographic format in the stored photographic formats cannot be cancelled to perform program photographing in accordance with the next photographic format.

As described above, a system which can change photographic formats during program photographing using an X-ray equipment has been desired.

SUMMARY OF THE INVENTION

It is an object of the present invention to provide a method and system for changing photographic formats in an X-ray equipment.

According to one aspect of the present invention, there is provided a method for changing photographic formats in an X-ray equipment, the method comprising the steps of:
  setting a plurality of first photographic formats;
  displaying the set first photographic formats; and
  acquiring X-ray images in accordance with the displayed first photographic formats,
    wherein the acquiring step includes the steps of:
    interrupting an X-ray image acquisition by the first photographic format when an interrupt signal is input during the X-ray image acquisition;
    setting at least one second photographic format; and
    obtaining at least one X-ray image in accordance with the set second photographic format.

According to another aspect of the present invention, there is provided a system for changing photographic formats in an X-ray equipment, the system comprising:
  inputting means for selectively inputting an interrupt signal and a skip signal;
  setting means for selectively setting a plurality of first photographic formats and at least one second photographic format;
  displaying means for displaying the set first photographic formats; and
  acquiring means for acquiring X-ray images in accordance with the first photographic formats,
    wherein the acquiring means includes interrupting means for interrupting an X-ray image acquisition by the first photographic format when the interrupt signal is input during the X-ray image acquisition, and at least one X-ray image is acquired in accordance with the set second photographic format during an interrupt period.

BRIEF DESCRIPTION OF THE DRAWINGS

FIG. 1 is a block diagram showing an arrangement of a system according to an embodiment of the present invention;

FIG. 2 is a flow chart showing sequence in process and control section;

FIGS. 3A and 3B are views showing an example of photographic formats; and

FIGS. 4A and 4B are operation flow charts for setting photographic formats, and executing program photographic in program process of sequence shown in FIG. 2.

DETAILED DESCRIPTION OF THE PREFERRED EMBODIMENTS

An embodiment of the present invention will be described hereinafter with reference to the accompanying drawings.

Referring to FIG. 1, a system according to this embodiment includes a photographic format input unit 1, a photographing program selection unit 2, a program set switch 3, a program start switch 4, an interruption switch 5, a skip switch 6, a microcomputer 7, a display 8, a film transfer controller 10, and a film transfer apparatus 11.

The photographic format input unit 1 has a plurality of format selection switches S1a to S1n for selecting a photographic format including film size and division format.

The photographing program selection unit 2 has a plurality of program selection switches S2a to S2n for selecting a different photographing program depending on, e.g., a portion to be diagnosed. The photographing program is constituted by a plurality of photographic formats.

The program set switch 3 is used to switch a mode to a program set mode for setting the photographing program.

The program start switch 4 is used to start program photographing in accordance with the photographing program selected by the program selection switches S2a to S2n.

The interruption switch 5 is used to temporarily interrupt program photographing.

The skip switch 6 is used to cancel the photographic format associated with the next photographing during program photographing.

Note that the format selection switches S1a to S1n and the skip switch 6 are momentary switches, and the program selection switches S2a to S2n and the switches 3 to 5 are lock type switches.

The microcomputer 7 includes a process and control section 7a, a memory 7b, and a display controller 7c.

The process and control section 7a performs, e.g., setting, execution, and display of the photographing program in accordance with an ON/OFF operation of the format selection switches S1a to S1n, the program selection switches S2a to S2n, the program set switch 3, the program start switch 4, the interruption switch 5, and the skip switch 6.

The memory 7b stores the photographing programs.

The display controller 7c performs a control operation to display the photographing program on the display 8.

The film transfer controller 10 controls the film transfer apparatus 11 in response to a format signal (associated with a photographic format) output from the process and control section 7a. The film corresponding to the photographic format is transferred to a predetermined position in an X-ray equipment (not shown).

When a film reset completion signal from the film transfer controller 10 are input to the process and control section 7a, the photographic formats in the photographing program stored in the memory 7b are read out in a predetermined order. In other words, the photographic formats are sequentially selected, and photographing is performed in accordance with the selected photographic formats.

When an interrupt signal is input from the interruption switch 5 during program photographing, the selection for the photographic formats is temporarily interrupted, and photographing is performed in accordance with a photographic format newly input by the format selection switches S1a to S1n. When an input of the interrupt signal is released, the program photographing is continued.

When a skip signal is input from the skip switch 6 during program photographing, the selected photographic format is cancelled, and the next photographic format is selected.

An operation of this system will be described hereinafter.

The process and control section 7a performs a process in accordance with sequence as shown in FIG. 2 That is, in step A1, an initialization is performed. Process of a signal input to the process and control section 7a is performed in step A2. Set of photographic formats, control of program photographing are performed in step A3. Display process of photographic formats in display 8 is performed in step A4. A format signal concerning a photographic format is output so as to transfer a film in step A5. Process of a signal output from the process and control section 7a is performed in step A6.

When photographic formats such as a film size and a division size are set, for example, after the program selection switch S2a is selected, and a photographing program set mode is set by the program set switch 3, the format selection switches S1a to S1n are operated. Therefore, a 10"×12" full size, a 10"×12" vertical two-division size, a 10"×12" horizontal two-division size, and a 10"×12" four-division size are set in a predetermined order, and the photographing program associated with the program selection switch S2a is stored in the memory 7b. This photographing program is displayed on the display 8, as shown in FIG. 3A.

For example, after the program selection switch S2b is selected, and the photographing program set mode is set by the program set switch 3, the format selection switches S1a to S1n are operated. Therefore, a 14"×14" full size, a 14"×14" vertical two-division size, a 10"×12" full size, and a 10"×14" horizontal two-division size are set in a predetermined order, and the photographing program associated with the program selection switch S2b is stored in the memory 7b. This photographing program is displayed on the display 8, as shown in FIG. 3B.

A setting operation for the photographing program in the process and control section 7a will be described below with reference to a flow chart in FIG. 4A. This setting operation is performed by the program process in the sequence shown in FIG. 2.

In step S1, it is determined whether or not the program selection switches S2a to S2n are ON.

If NO in step S1, a normal mode is set. In step S2, a photographic format is input by the format selection switches S1a to S1n to output a format signal associated with this photographic format to the film transfer controller 10.

If YES in step S1, it is determined whether or not the program set switch 3 is ON in step S3.

If YES in step S3, a photographing program set mode is set. In step S4, it is determined whether or not a photographic format is input by the format selection switches S1a to S1n.

If YES in step S4, the photographic format is stored in the memory 7b (step S5), and is transferred to the display 8 through the display controller 7c (step S6).

Program photographing is performed as follows.

In the above-mentioned photographing program set mode, a photographing program is stored in the memory 7b by the program selection switch S2a. The photographing program is read out from the memory 7b by the program selection switch S2a in a photographing program execution mode, and is displayed on the display 8.

When the program start switch 4 is turned on, a photographic format (10"×12" full size) in the photographing program stored in the memory 7b is read out (FIG. 3A). A format signal associated with this photographic format is input to the film transfer controller 10. The 10"×12" film is transferred to a predetermined position in the X-ray equipment by the film transfer apparatus 11. An X-ray radiation field is set to the 10"×12" full size.

A doctor or a radiographer turns on an X-ray generation switch (not shown) to perform photographing. After photographing is completed, the film is contained in a film containing case (not shown). A film reset completion signal is transmitted from the film transfer controller 10 to the process and control section 7a. The next photographic format (10"×12" vertical two-division size) is read out from the memory 7b in response to the film reset completion signal. Program photographing is sequentially performed by the above-described operations.

A case wherein the photographic format is changed during program photographing, e.g., a case wherein, in the photographing program including the photographic formats shown in FIG. 3A, after photographing by the second photographic format having a 10"×12" vertical two-division size is completed, photographing by the photographic format having a 10"×12" vertical two-division size is further performed, will be described hereinafter. Assume that the third photographic format used in the next photographing is blinking-displayed on the display 8.

When the interruption switch 5 is turned on after the third photographic format (10"×12" full size) is set, program photographing is temporarily interrupted, and an input waiting state for the new photographic format is set. The blinking display is interrupted.

When the 10"×12" vertical two-division size is set by the format selection switches S1a to S1n, a format signal associated with this size is input to the film transfer controller 10. The 10"×12" film is transferred to the predetermined position in the X-ray equipment by the film transfer apparatus 11. After the X-ray radiation field is changed into the 10"×12" vertical two-division size, photographing is performed. After photographing is completed, an input waiting state for the next photographic format is set.

When the interruption switch 5 is turned off, the photographing program execution mode is set, and the third photographic format on the display 8 is blinking-displayed. A format signal associated with this photographic format is input to the film transfer controller 10. The 10"×12" film is transferred to the predetermined position in the X-ray equipment by the film transfer apparatus 11. After the X-ray radiation field is set to the 10"×12" full size, photographing is performed.

Assume that, in the photographing program including the photographic formats shown in FIG. 3A, after the sixth photographic format having a 10"×12" horizontal two-division size is set, photographing by this 10"×12" horizontal two-division size is not performed. When the skip switch 6 is turned on, the seventh photographic format (10"×12" four-division size) on the display 8 is blinking-displayed, and a format signal associated with this photographic format is input to the film transfer controller 10. After the X-ray radiation field is changed to the 10"×12" four-division size, photographing is performed. Note that when the skip switch 6 is continuously turned on, the photographic formats can be continuously cancelled.

An operation of the process and control section 7a in program photographing executed in accordance with the set photographing program will be described below with reference to a flow chart in FIG. 4B. This setting operation is performed by the program process in the sequence shown in FIG. 2.

When the program selection switches S2a to S2n are turned on in step S1, and the program set switch 3 is not turned on in step S3, the photographing program execution mode is set. It is determined in step S7 whether or not the program start switch 4 is ON.

If NO in step S7, a photographing program is output to the display 8 through the display controller 7c in step S8.

If YES in step S7, it is determined in step S9 whether or not the interruption switch 5 is ON.

If NO in step S9, it is determined in step S10 whether or not the skip switch 6 is ON.

If NO in step S10, it is determined in step S11 whether or not a film reset completion signal is input.

If it is determined in step S11 that the film reset completion signal is not input, a photographic format is read out from the memory 7b in step S12. In step S13, a format signal associated with this photographic format is input to the film transfer controller 10. In step S14, the photographic format which is currently set is blinking-displayed on the display 8.

If it is determined in step S9 that the interruption switch is ON, the blinking display of the photographic format is interrupted in step S15. In step S16, a format signal associated with the photographic format newly input by the format selection switches S1a to S1n is input to the film transfer controller 10.

If the skip switch 6 is ON in step S10, or the film reset completion signal is input in step S11, a pointer is incremented by one (step S17). This pointer designates a photographic format to be read out from the memory 7b. Note that this pointer is set at "0" when the program start switch 4 is turned on.

As described above, in this embodiment, when the format selection switches S1a to S1n, the program selection switches S2a to S2n, and the program set switch 3 are used, the photographing program including a plurality of photographic formats is stored in the memory 7b. Then, the photographic formats stored in the memory 7b are read out by the program start switch 4 in the predetermined order, and program photographing is executed in accordance with the readout photographic formats.

When the interrupt signal is input from the interruption switch 5 during program photographing, a read operation of a photographic format from the memory 7b is temporarily interrupted, and photographing by a photographic format newly input by the format selection switches S1a to S1n is performed.

When the skip signal is input from the skip switch 6 during program photographing, the read out photographic format is cancelled, and photographing by the next photographic format is performed.

According to this embodiment, photographing by a photographic format different from the photographic formats stored in advance can be performed during program photographing. In addition, since an unnecessary photographic format in the photographing program can be cancelled, program photographing by the next photographic format can be performed.

Although the present invention has been described with reference to its particular embodiment, the present invention is not limited thereto, and various changes and modifications may be made without departing from the spirit and scope of the invention.

What is claimed is:

1. A method for changing photographic formats in an X-ray equipment, the method comprising the steps of:
   setting a plurality of first photographic formats to be used at a desired order;
   displaying the set first photographic formats; and
   acquiring first X-ray images in accordance with the displayed first photographic formats at the desired order;
   interrupting an acquisition of the first X-ray images when an interrupt signal is input;
   setting at least one second photographic format; and
   detecting said interrupt signal being input and obtaining at least one second X-ray image in accordance with the set second photographic format during said interrupt signal being input, and resuming acquisition of the first X-ray images after the interruption when an input of the interrupt signal is no longer being input, in accordance with the first photographic formats.

2. The method according to claim 1, further comprising the step of canceling at least one first photographic format when a skip signal is input during the acquisition of the first X-ray images.

3. A system for changing photographic formats in an X-ray equipment, the system comprising:
   setting means for setting a plurality of first photographic formats at a desired order and at least one second photographic format;
   displaying means for displaying the set first photographic formats;
   acquiring means for acquiring first X-ray images in accordance with the first photographic formats at the desired order; and interrupting means for interrupting an acquisition of the first X-ray images when an interrupt signal is input, and for acquiring at least one second X-ray image in accordance with the set second photographic format during said interrupt, and for resuming the acquisition of the first X-ray images after the interruption in accordance with the first photographic formats when an interrupt signal is released.

4. The system according to claim 3, further comprising means for canceling at least one first photographic format when a skip signal is input during the acquisition of the first X-ray images.

5. A method for changing photographic formats in an X-ray equipment, the method comprising the steps of:
setting a plurality of first photographic formats at a desired order;
displaying the set first photographic formats;
executing a first X-ray image acquisition in accordance with the displayed first photographic formats at the desired order;
canceling at least one of said first photographic formats when a skip signal is recognized during the first X-ray image acquisition;
interrupting the first X-ray image acquisition when an interrupt signal is recognized;
setting at least one second photographic format;
executing a second X-ray image acquisition in accordance with the set second photographic format during an interruption; and
resuming the first X-ray image acquisition after the interruption in accordance with the first photograph formats after the second X-ray image acquisition is completed.

6. A system for changing photographic formats in X-ray equipment, the system comprising:
setting means for setting ones of a plurality of first photographic formats at a desired order and at least one second photographic format;
displaying means for displaying the set first photographic formats;
acquiring means for acquiring first X-ray images in accordance with the first photographic formats at the desired order;
canceling means for recognizing a skip signal and canceling at least one of said first photographic formats when a skip signal is recognized; and
interrupting means for recognizing an interrupt signal, and interrupting an acquisition of the first X-ray images when said interrupt signal is recognized, and
wherein at least one second X-ray image is acquired by the acquiring means in accordance with the set second photographic format during an interrupt, and the acquisition of the first X-ray images are resumed at the interruption in accordance with the first photographic formats when an input of the interrupt signal is released.

* * * * *